United States Patent [19]

Crooks et al.

[11] 3,924,995

[45] Dec. 9, 1975

[54] APPARATUS FOR MOLDING ARTICLES

[75] Inventors: Russell W. Crooks, Lachute; Gregory Maya, Laval, both of Canada

[73] Assignee: Electromould Engineering Limited, Lachute, Canada

[22] Filed: Dec. 23, 1974

[21] Appl. No.: 536,960

[52] U.S. Cl. ............. 425/243; 425/119; 425/129 S; 425/246
[51] Int. Cl.²..... B29C 3/00; B29F 1/08; B29H 7/08
[58] Field of Search ........ 425/119, 129 S, 242, 243, 425/246, 96

[56] References Cited
UNITED STATES PATENTS

| | | | |
|---|---|---|---|
| 3,005,235 | 10/1961 | Patera | 425/246 X |
| 3,006,032 | 10/1961 | Baker et al. | 425/119 X |
| 3,109,200 | 11/1963 | Ludwig | 425/246 X |
| 3,131,432 | 5/1964 | Battell et al. | 425/119 |
| 3,302,243 | 2/1967 | Ludwig | 425/246 X |
| 3,350,748 | 11/1967 | McIlvin | 425/119 X |
| 3,416,203 | 12/1968 | Ojenne et al. | 425/96 |
| 3,448,490 | 6/1969 | DeRyck | 425/119 |
| 3,591,893 | 7/1971 | Vicini | 425/129 S X |
| 3,709,973 | 1/1973 | Maltby | 425/129 S X |

*Primary Examiner*—J. Howard Flint, Jr.
*Attorney, Agent, or Firm*—Robert E. Mitchell

[57] ABSTRACT

A continuous automatic molding apparatus having a chain conveyor and a continuous track for carrying a mold carriage and a plurality of mold carriages. The mold carriages carry mold members which are split to open in opposite directions laterally of the direction of travel of the conveyor. First heating means for heating the mold members when they are split open. Means downstream of the heating means for closing the mold member. Moldable plastic injecting means downstream of the mold closing means for injecting plastic into the closed mold. Means downstream of the plastic injecting means for opening the mold. Means downstream thereof for automatically lifting and moving the plastic molded articles from the open mold.

13 Claims, 6 Drawing Figures

FIG. I

APPARATUS FOR MOLDING ARTICLES

BACKGROUND OF THE INVENTION

1. Field of the Invention

The present invention relates to the manufacture of molded articles, and particularly to an apparatus for continuously molding such articles from plastic material.

2. Description of the Prior Art

In the production of footwear, it is known to prepare a split mold about a fixed last and to bring the mold into registry with an injector and to inject a moldable plastic into the mold and then to cure to solidify the plastic. The mold is then opened and the article of footwear is removed from the last. The molds may be brought to the injector manually, on a conveyor or a rotary table.

Such devices are described in U.S. Pat. Nos. 3,005,235, Patera, 1961; 3,302,243, Ludwig, 1967; 3,246,364, Lang et al., 1966; and 3,299,331, Tusa et al., 1966, which relate or could relate to the manufacture of plastic footwear; and U.S. Pat. No. 3,416,203, Ozenne et al., 1968, which relates to casting ceramic articles. The Patera and Ludwig patents relate to rotary devices which, of course, limit the number of molds which can be used in a production installation as well as the operations which can be made to the mold.

The Ozenne et al patent relates to an endless chain conveyor on which any number of molds can be mounted and passed through any number of operations. The endless chain conveyor of Ozenne et al is described in conjunction with ceramic molding and a relatively complicated mold handling apparatus for opening and closing the molds is described.

SUMMARY OF THE INVENTION

It is an aim of the present invention to provide an improved conveyor system of the type described in Ozenne et al used in the molding of plastic objects such as footwear.

It is also an aim of the present invention to provide an improved mold opening and closing apparatus which is simpler and more efficient than the conventional systems including the Ozenne et al system.

It is a further aim of the present invention to provide an automatic, completely integrated molding system for producing plastic footwear.

It is understood that reference in the present specification to moldable plastic material means any suitable plastic material which can be injected in a mold in a liquid condition and will harden or set in the mold when heat is applied.

A construction in accordance with the present invention includes a molding apparatus comprising a conveyor for mold members wherein the mold members are split to open in opposite directions laterally of the direction of the conveyor, a first heating means for heating the mold members when they are opened, means downstream of the heating means for closing the mold members, moldable plastic injecting means downstream of the mold closing means for injecting plastic into the closed mold, means downstream of the plastic injecting means for opening the mold, and means downstream thereof for automatically lifting and removing the plastic molded article from the open mold.

More specifically, a mold member for use on a continuous conveyor includes a base carriage adapted for movement with the conveyor in the direction thereof, a pair of split mold pieces mounted on the carriage and adapted to be moved laterally relative to the direction of the carriage in opposite directions to each other from an open position where the mold pieces are spaced apart and a closed position where the mold pieces are abutting together and forming a molding cavity, means adapted to move the mold pieces, and means for locking the mold pieces in a closed position.

BRIEF DESCRIPTION OF THE DRAWINGS

Having thus generally described the nature of the invention, it will now be referred to in more detail by reference to the accompanying drawings, in which.

DESCRIPTION OF THE PREFERRED EMBODIMENT

Figure 1:
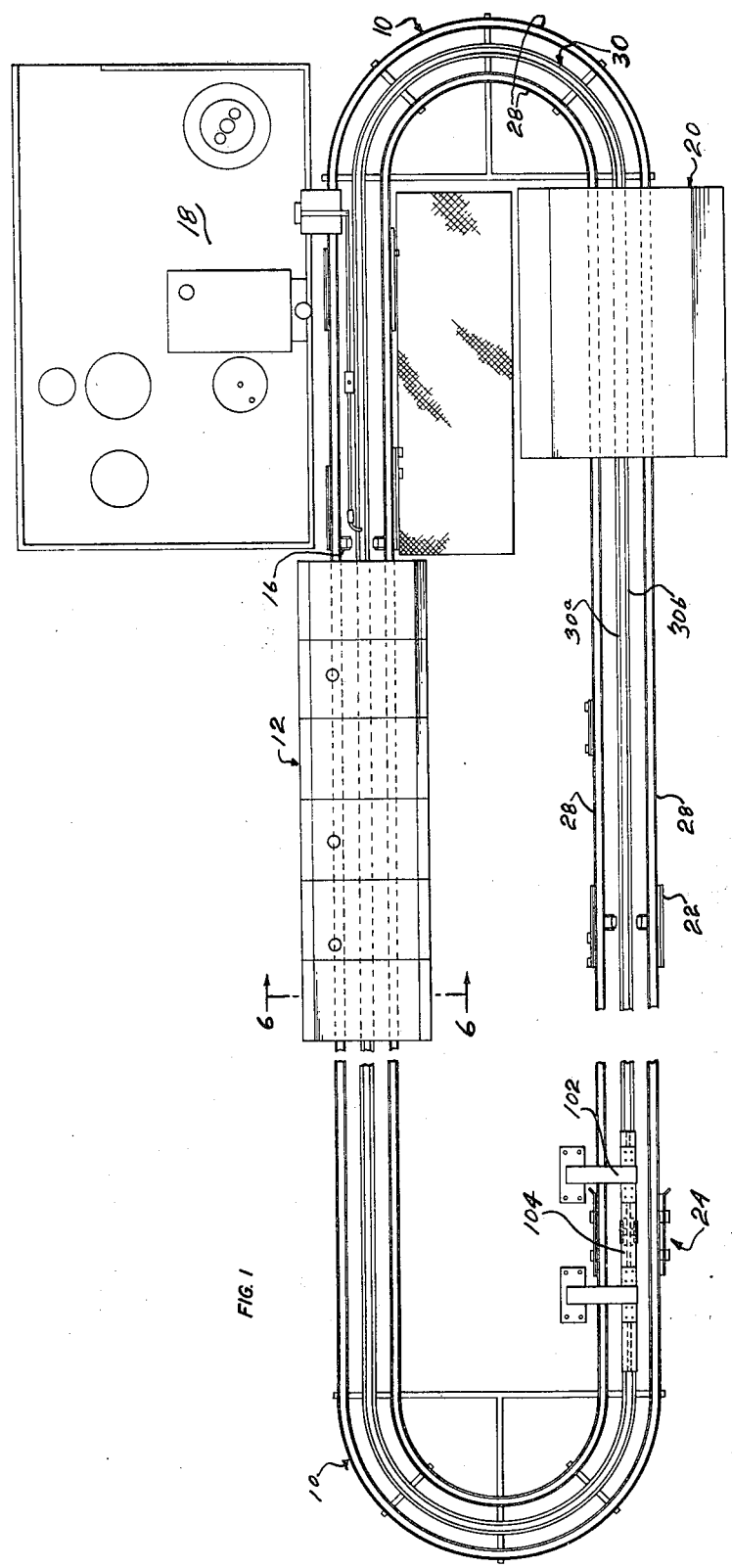
FIG. 1 is a top plan view of the apparatus.
Figure 2:
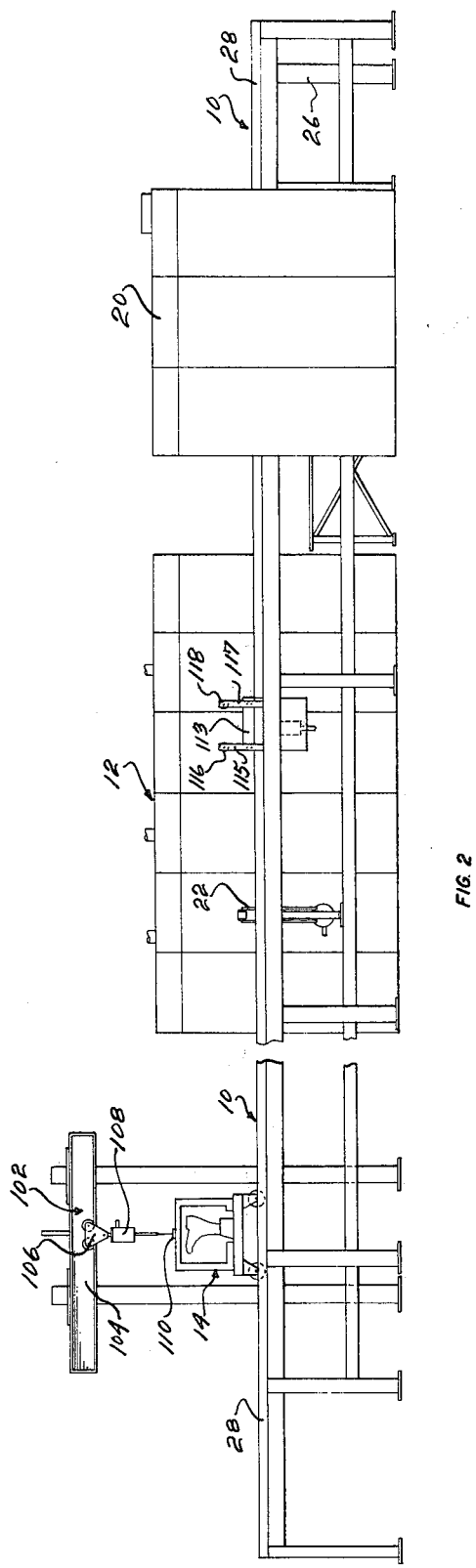
FIG. 2 is a side elevation thereof.
Figure 3:
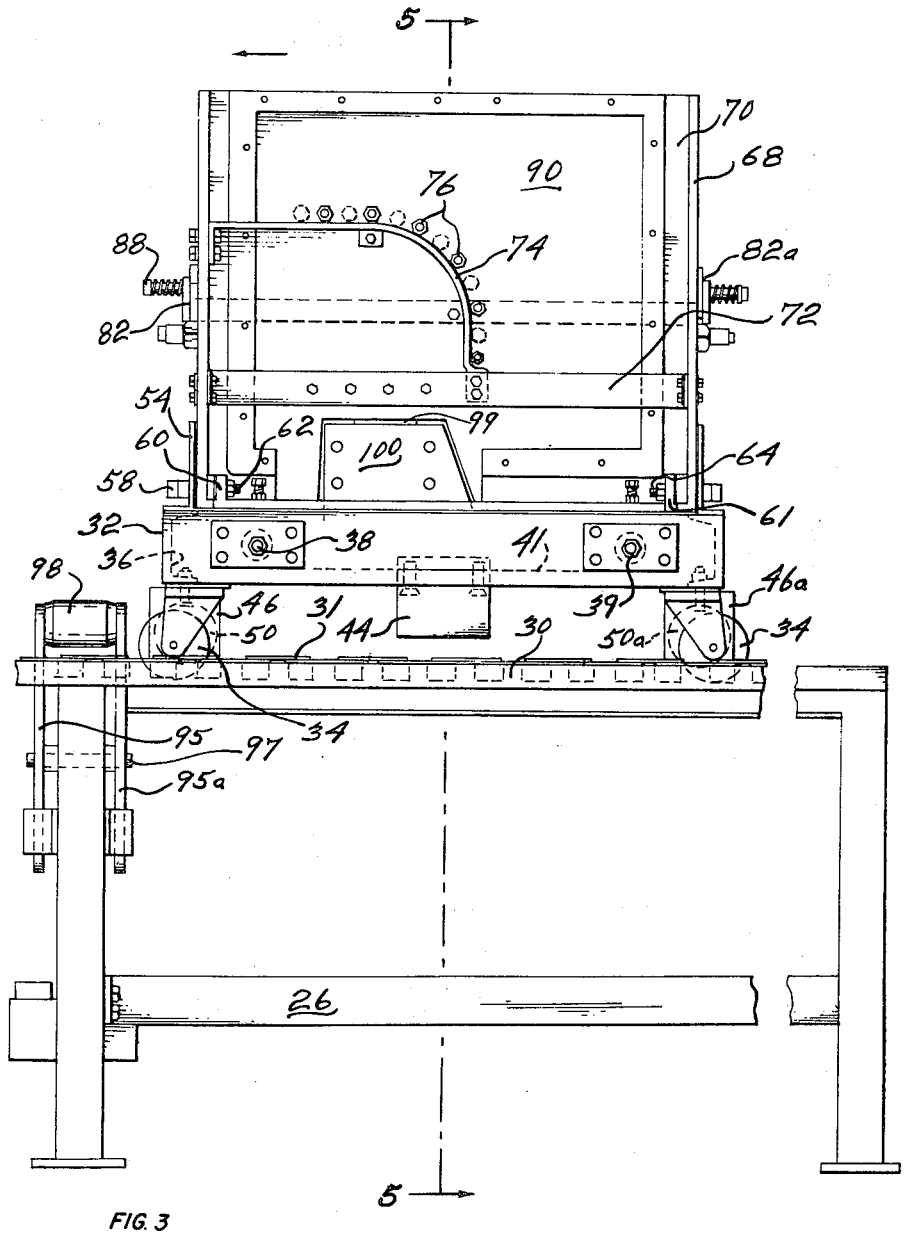
FIG. 3 is a side elevation of the mold members in a closed position.
Figure 4:
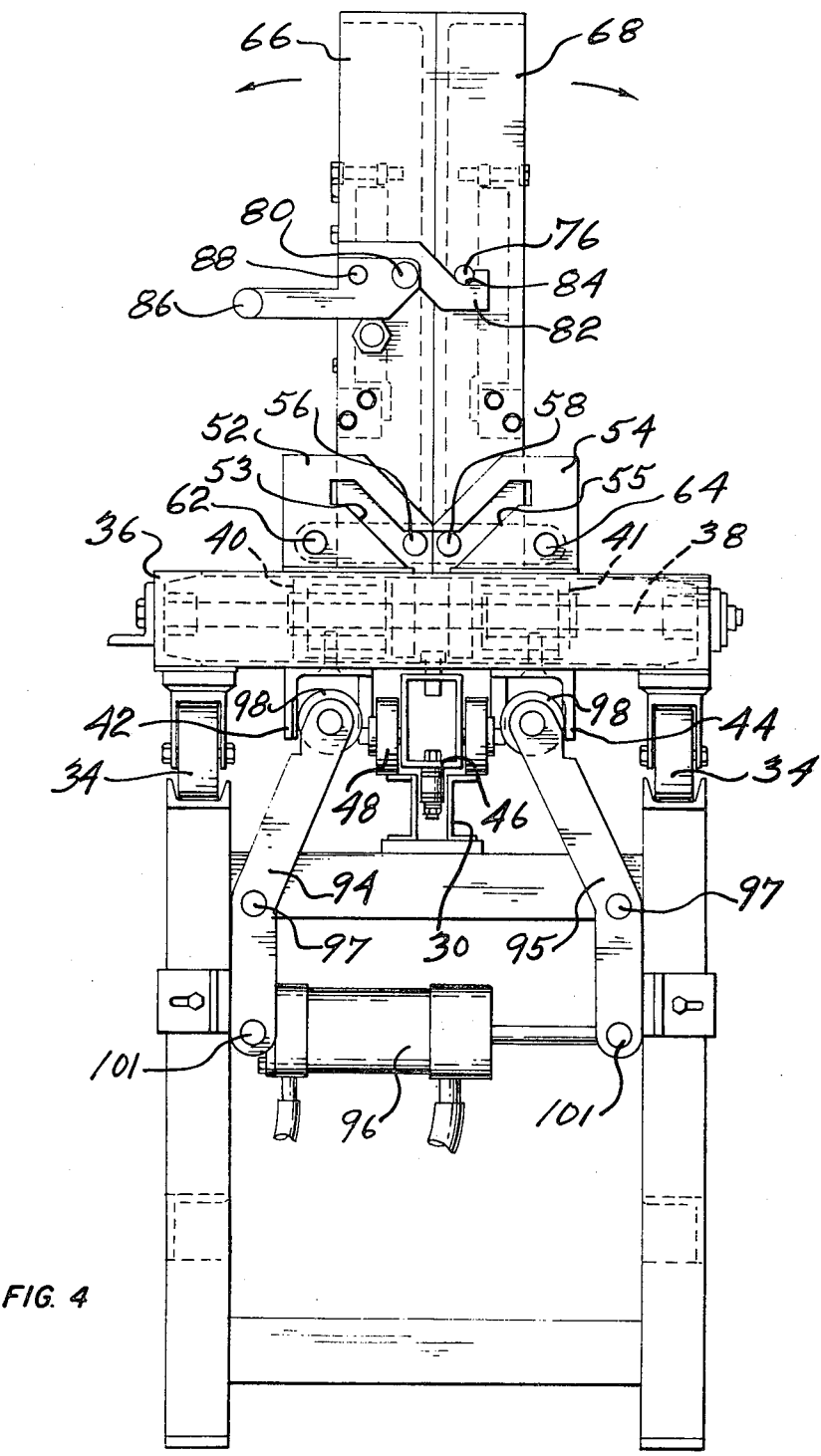
FIG. 4 is an end elevation of the mold member of FIG. 3.

Referring now to FIGS. 1 and 2, there is illustrated a conveyor 10 in a continuous loop. A linear oven 12 is provided over a portion of the conveyor 10, and a plurality of mold carriages 14 are made to move along the conveyor through the linear oven 12. Downstream of the oven 12 is a mold closing station 16, and farther downstream from the mold closing station 16 is a plastic mixing and injection station 18. Passing downstream of the injector 18 is a curing oven 20 which can be provided optionally on the conveyor 10. A mold opening device 22 is provided downstream of the curing oven 20, and a boot removal station 24 is provided downstream of the mold opening station 22.

The conveyor 10 includes a conveyor frame 26 having a pair of wheel tracks 28. Centrally between the wheel tracks 28 is a chain track 30 which is made up of a pair of oppositely facing channel members 30a and 30b. The chain 31 passes between the channel members 30a and 30b.

Referring now to FIGS. 3 to 6, there is shown a mold carriage 14 which includes the carriage base 32 on which are mounted four idler wheels 34. The idler wheels 34 are made to train in the tracks 28 of the conveyor 10. The carriage base 32 has frame members 36 to which are fastened laterally extending rods 38.

A pair of sliding members extending in the longitudinal direction of the carriage are mounted for sliding movement on the rods 38 and 39. Each sliding member 40 and 41 has downwardly facing channel members 42 and 44 respectively protruding below the carriage frame 36. On the base 32 of the carriage 14 is also provided a chain engaging member 46 having guide wheels 48 and 50 on either side thereof rolling on the upper flanges of channels 30a and 30b.

Pairs of cam members 52 and 54 are mounted to the carriage base 32 at the fore and aft sections of the carriage 32 and are adapted to receive cam followers 56 and 58 as will be described further. Each sliding member has an upward extension 60 and 61 respectively and pivot pins 62 and 64, 62a and 64a respectively are provided for pivotably mounting the mold frames 66 and 68. The cam followers 56 and 58 are provided on the base of the mold frames 66 and 68 and are adapted to follow the guide slots 53 and 55 of the cam members 52 and 54 respectively.

The mold frames 66 and 68 include an inwardly extending flange to which the molds 89 and 90 are adjustably mounted respectively. A bar 72 extends between opposite side walls of the frame 68, for instance, and a curved orientation back-up member 74 is bolted to the side frame of the mold frame 68, for instance, and to the bar 72. The mold may be provided with a series of studs having nuts thereon adapted to engage the back-up bar 74 for orientation on the frame.

The mold frames 66 and 68 are locked together in the closed-position by means of a lever-type locking device. A lock lever 82 having a recess 84 is pivotably mounted on pivot pin 80 provided on the mold frame 66. The lever, which in the present embodiment is made of two pieces, also includes a longitudinal handle 86. The recess portion of the lever is adapted to engage a locking pin 76 provided on the mold frame 68. Spring pins 88 may be provided to allow for secure engagement of the locking pin 76. A spring pin 88 may be adapted to engage a slight depression in the mold frame 66 to hold the lock lever 82 in its locking position when the mold pieces are closed and in its unlocked position when the mold pieces are opened.

A last support 100 may be mounted to the carriage frame 36 and mounts a suitable last 99 which is adapted to fit within the mold cavity when the mold frames 66 and 68 are closed.

At the mold closing station 16 and the mold opening station 22, there are similar mold operating devices which will be described as follows. On a cross member of the frame 26 below the carriage 32, there is provided a pair of bent flat bar arms 94 and 94a and a pair of arms 95 and 95a in an opposed position, with each pair connected to each end of a floating cylinder and piston device 96. The arms 94, 94a and 95, 95a are pivoted to a cross member of the frame 26 at 97 by means of pins 97. The other ends of the arms 94 and 95 include idler rollers 98 which are adapted to engage within the channels 42 and 44 described earlier.

Figure 5:
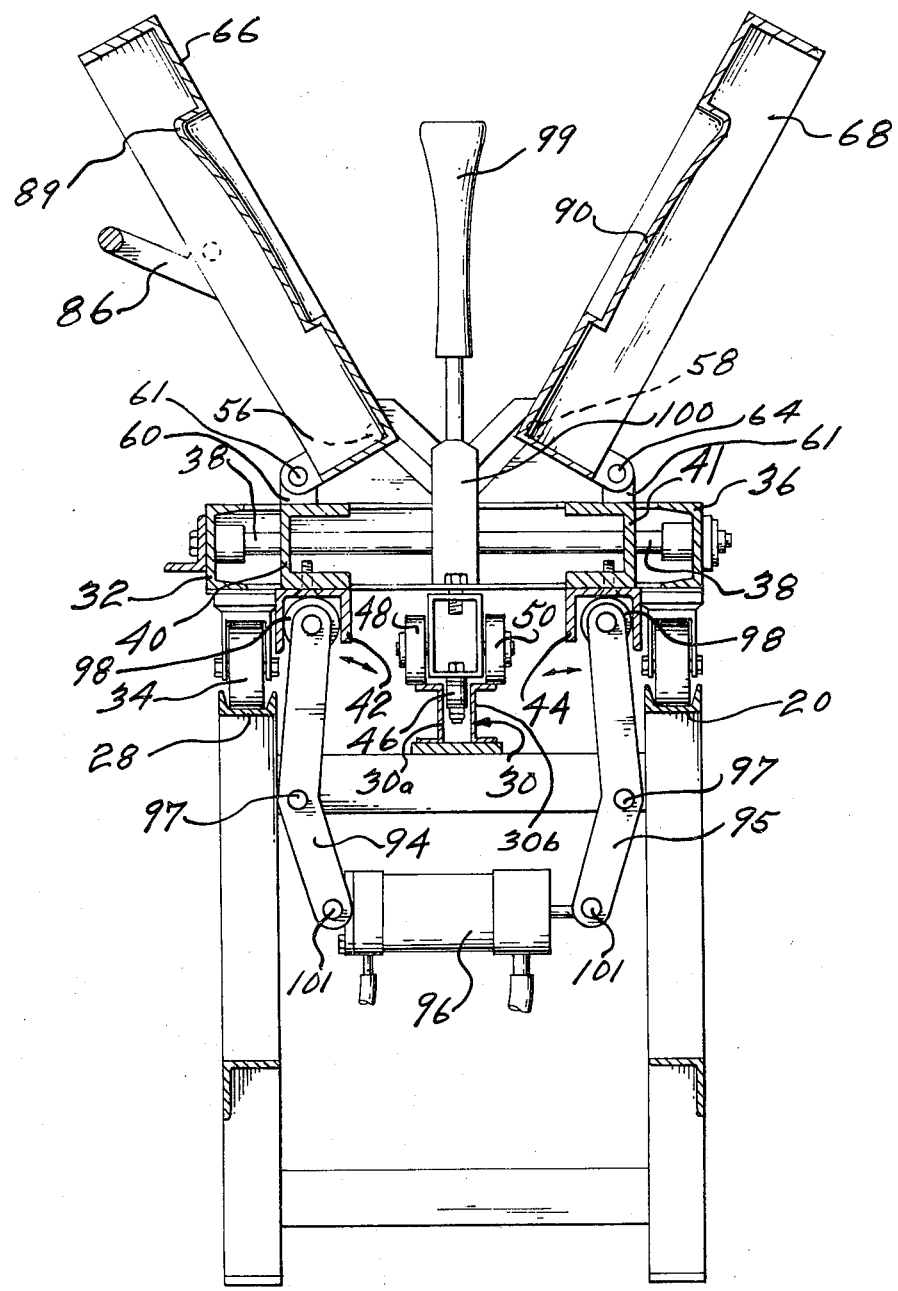
FIG. 5 is a cross-section taken along lines 5—5 in FIG. 3 but with the mold in an open position.

In operation, the mold or carriage 14 would advance along the conveyor 10 through the linear oven 12 in an open position as shown in FIG. 5, but as it would arrive at a position substantially at the closing station 16, a limit switch (not shown) would be actuated by the carriage thereby causing the piston and cylinder 96 to expand telescopically forcing the two pairs of arms 94 and 95 to pivot about respective pivot points 97 inwardly. This movement of the arms 94 and 95 would force the channels 42 and 44 and therefore the sliding members 40 and 41 to slide inwardly on the carriage frame 36 and the rods 38 and 39. Entraining the pivot pins 62 and 64 such that the cam followers 56 and 58 would be forced to move downwardly and inwardly along the slots 53 and 55 respectively such that the mold frames 66 and 68 would abut each other. The handle 86 would then be depressed manually or by suitable means so that the recessed locking lever 82 would engage the locking pin 76 to hold the molds together.

As the closed carriage moves forward, the operator would insert a flexible nozzle emanating from the injector apparatus 18 which is shown only schematically in FIG. 1. The flexible nozzle would be maneuvered into an opening at the top of the mold and a predetermined amount of moldable plastic material in liquid form would then be injected into the mold as the mold carriage 32 advances slowly.

At the mold opening station 16, the handle 86 would be engaged by wheels 116 and 118 mounted on wheel supports 115 and 117 which in turn are mounted on the sliding plate 113. The wheels 116 and 118 would be forced to engage the handle 86 and move it upwardly thereby locking the molds in preparation for the actual mold opening operation at station 22. The opening of the mold is performed in exactly the reverse cycle described for the mold closing apparatus at the station 16.

As the carriage 14 advances along the conveyor 10, it arrives at the boot removal station 24. The boot removal station includes a hoisting frame 102 on which is provided a horizontal beam with flanges providing a track 104. A hoist traveller 106 is adapted to slide on the track 104. The traveller 106 includes a piston and cylinder arrangement which in turn mounts a boot gripper 110. Upon the approach of the open carriage 32, a suitable switch is actuated forcing the cylinder 108 to telescope and causing the boot gripper to engage the molded boot and the last in the open mold and for the cylinder to retract, thereby removing the boot while the traveller 106 moves along the track 104 in response to the movement of the mold carriage 14.

Figure 6:
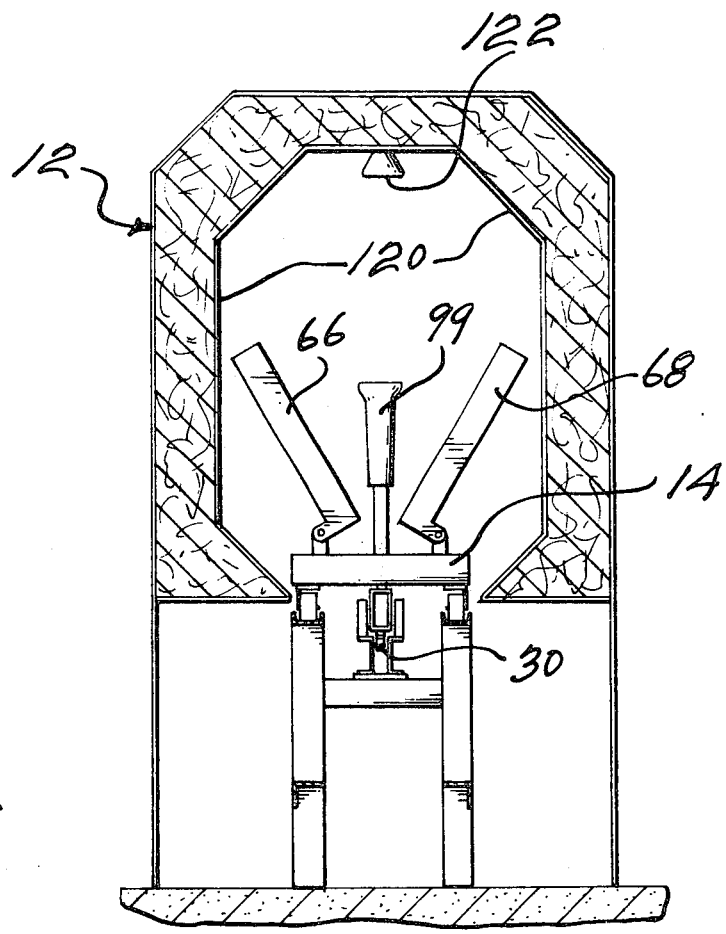
FIG. 6 is a vertical cross-section taken along line 6—6 of FIG. 1.

Referring now to FIG. 6, there is shown the interior of the oven 12. The oven 12 includes a housing and an interior bore to which the mold carriage can travel. The shape of the bore is octagonal and includes smooth reflective surfaces 120, such as polished stainless stell plate. At the top of the octagonal bore there is provided infrared lamps 122.

The length of the bore or tunnel can be increased or decreased depending on the temperature required and the speed of travel of the carriage. In operation, as the carriage 14 leaves the boot removal station 102, it travels along the conveyor 10 until it is pulled through the oven 12. As it passes through the oven 12, the opened molds on the carrier 14 are heated to a predetermined temperature for setting the molded plastic material to be inserted. Typically, the mold would be heated to approximately 180°F. Once the carriage 32 exits from the oven 12, it arrives at the station 16 always being pulled by the chain 31, and the mold is closed as described earlier.

Once the molded plastic material has been injected into the closed mold 14 and it advances along the conveyor 10, the heat already absorbed in the molds 89 and 90 cause the suitable plastic to be set. A further oven 20 of similar construction to oven 12 can be provided for increasing the curing of the plastic in the mold.

Finally, the carriage 32 proceeds to the mold opening station 22, and after being opened, the boot is removed as explained at the boot removal station 102. The time required to set the plastic being used can be determined by varying the speed of the chain drive pulling the carriage 32 or increasing the length of the sections of the track forming the conveyor 10.

We claim:

1. An apparatus for molding articles comprising a conveyor for carrying mold members, wherein the mold members are split to open in opposite directions laterally to the direction of travel of the conveyor, a first heating means for heating the mold members as they are opened and passing on the conveyor, means downstream of the heating means for closing the mold members, moldable plastic injecting means downstream of the mold closing means for injecting plastic into the closed mold, means downstream of the plastic injecting means for opening the mold, and means downstream thereof for automatically lifting and removing the plastic molded articles from the open mold.

2. An apparatus as defined in claim 1, wherein the conveyor means includes an elongated continuous loop conveyor having a pair of wheel receiving tracks and a driven continuous chain for pulling the mold members.

3. An apparatus as defined in claim 2, wherein the mold members include a base carriage having wheels for entraining in the wheel receiving tracks of the conveyor, and means for engaging the driven chain for entraining the carriage mounting the mold members along the conveyor.

4. An apparatus as defined in claim 1, wherein the heating means includes an elongated housing covering a portion of the conveyor, a bore co-axial with the conveyor through which the mold members pass, the bore being defined by reflective surfaces providing an octagonal cross-section to the bore, and heating means provided adjacent one of the reflective surfaces.

5. An apparatus as defined in claim 4, wherein a second heating means including a housing and a co-axial bore therethrough is provided downstream of the plastic injecting means for further curing of the plastic molded article.

6. An apparatus as defined in claim 2, wherein the mold opening means and the mold closing means have identical structures including a pair of arms provided on the conveyor frame adapted to move in directions opposite to each other laterally of the direction of travel of the conveyor and carriage, said arms being adapted to engage arm receiving means on the carriage as the carriage passes thereover, whereby upon actuation of the arms for movement away or towards each other, the mold members will be caused to open or close.

7. A mold member for use in a continuous conveyor, including a base carriage adapted for movement with the conveyor in the direction thereof, a pair of split mold pieces mounted on the carriage and adapted to be moved laterally relative to the direction of the carriage in opposite directions to each other from an open position where the mold pieces are spaced apart and a closed position where the mold pieces are abutting together and forming a mold cavity, means adapted to move the mold pieces, and means for locking the mold pieces in a closed position.

8. An apparatus as defined in claim 7, wherein each of the mold pieces includes a mold frame, means for receiving the orientation means for orienting the mold exactly on the frame.

9. An apparatus as defined in claim 8, wherein the orientation means includes a bar having a horizontal component and a vertical component mounted to the mold frame adapted to receive projections on the mold for orienting the mold piece in the frame.

10. Mold members for use on a continuous conveyor, in which there is provided means for opening and closing the mold members in a lateral direction to the direction of travel of the conveyor, arms being provided on the conveyor for engaging arm receiving means on the mold base carriage, said mold base carriage mounting a pair of split mold pieces adapted to move laterally relative to the direction of the carriage in opposite directions to each other from an open position where the mold pieces are spaced apart and a closed position where the mold pieces are abutting together, and means for locking the mold pieces in a closed position.

11. An apparatus as defined in claim 10, wherein the mold carriage mounts sliding members adapted to move in directions opposite to each other laterally of the direction of the conveyor, channel means extending downwardly from each sliding means adapted to be engaged by the pivoting arms on the conveyor frame, cam means mounted on the carriage, each mold piece being pivotally mounted to one of the sliding members and each mold piece mounting a separate cam follower, the cam means including a slot adapted to receive the cam follower such that when the sliding members are moved in directions away from each other by means of the pivoting arm, the cam followers will force the mold pieces to pivot outwardly while they are being separated laterally.

12. An apparatus as defined in claim 11, wherein the locking means includes a pivoting lock lever having a horizontally extending handle projecting from one of the mold pieces, the lock lever being mounted on said mold piece and adapted to engage a locking pin on the other of the mold pieces.

13. An apparatus as defined in claim 1, wherein the molded article removing means includes a hoisting frame having a track co-extensive with a portion of the conveyor and a track being suspended above said conveyor, a traveller mounting a cylinder hoisting device and provided for movement on the track, a piston and cylinder hoisting device including means for gripping the molded article as the open mold members pass underneath the track.

* * * * *